March 8, 1966 R. O. WINDER 3,239,689

LOGIC CIRCUITS

Filed April 19, 1963 5 Sheets-Sheet 1

INVENTOR.
ROBERT O. WINDER
BY
Samuel Cohen
Attorney

INVENTOR.
ROBERT O. WINDER
BY
Samuel Cohen
Attorney

March 8, 1966 R. O. WINDER 3,239,689

LOGIC CIRCUITS

Filed April 19, 1963 5 Sheets-Sheet 3

INVENTOR.
ROBERT O. WINDER
BY
Samuel Cohen
Attorney

INVENTOR.
ROBERT O. WINDER
BY Samuel Cohen
Attorney

March 8, 1966 R. O. WINDER 3,239,689

LOGIC CIRCUITS

Filed April 19, 1963 5 Sheets-Sheet 5

INVENTOR.
ROBERT O. WINDER
BY Samuel Cohen
Attorney

United States Patent Office 3,239,689
Patented Mar. 8, 1966

3,239,689
LOGIC CIRCUITS
Robert O. Winder, Trenton, N.J., assignor to Radio Corporation of America, a corporation of Delaware
Filed Apr. 19, 1963, Ser. No. 274,089
7 Claims. (Cl. 307—88.5)

This invention relates to selection circuits and is useful in a number of data processing and other applications.

An object of the invention is to provide a selection circuit which can handle relatively large numbers of input lines.

Another object of the invention is to provide line selection circuits in which the logic elements have reasonable "fan-in" and "fan-out" requirements. The term "fan-in" refers to the number of inputs a stage receives and the term "fan-out" refers to the number of outputs a stage must provide.

A circuit according to the invention includes means manifesting a parallel binary word having $n$ bits, in some specified order, each of different rank. The circuit includes $n$ gates arranged in groups of up to $m$ gates each, where $m$ is an integer smaller than $n$. The gates each receive a different bit and the gates of each group receive bits of immediately successive rank. As one example, the number $m$ of gates in each group may be 3 to 10 or so, and the total number $n$ of gates may be considerably larger, such as 100 or 1,000. If $n$ is a number such as 3, a group of $m$ gates may, for example, receive the $2^0$, $2^1$ and $2^2$ bits or, as another example, the $2^3$, $2^4$ and $2^5$ bits. Inhibit circuit means, in response to the reception by a gate of a bit of given value, disables the other gates, if any, in the same group which receive bits of higher rank. The circuit also includes a plurality of cumulative inhibit circuit means, one per group of gates. Each cumulative inhibit circuit means, in response to the presence of a disabling signal in its group, disables all gates of the next succeeding group of $m$ gates and causes also the cumulative gate circuit means for all successive groups of gates to produce disabling signals.

The invention is discussed in greater detail below and is described in the following drawings of which:

There are a number of applications in data processing systems in which signals appear in parallel on a number of input lines and in which it is necessary to select these signals, in sequence, in a relatively short interval of time. One such application, for example, is in connection with computer controlled communications systems. In this application, the input lines may indicate whether or not a channel corresponding to the line contains data (a message) which must be processed. The straightforward way this can be done is to sample the lines in sequence. However, this is time consuming as the presence or absence of a signal at each line must be sensed whether or not there is actually a signal there. To reduce this time interval selection circuits have been developed which essentially skip from active line to active line (an active line is defined here as one carrying a signal), ignoring the lines which are inactive. The present invention relates to an improved selection circuit of this type.

Figures 1, 3:
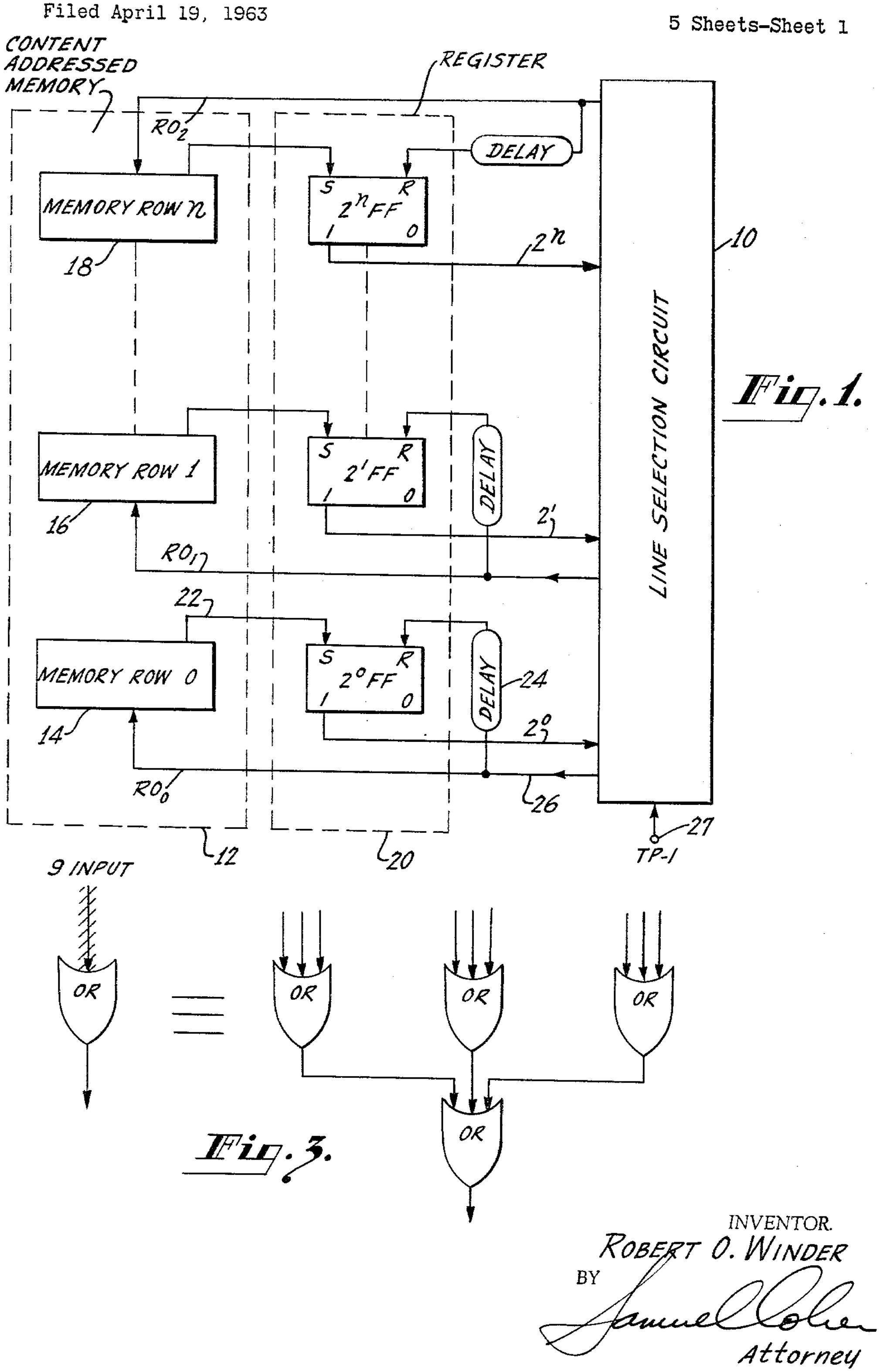
FIG. 1 is a block circuit diagram illustrating one use of the line selection circuits of the present invention.
FIG. 3 is a block circuit diagram showing a prior network for simulating a logic function in which the number of inputs (fan-in) to each logic gate is reduced by increasing the number of gates in the network.

FIG. 1 illustrates another application in which a circuit of the invention may be used. The problem dealt with in FIG. 1 is that of reading out a content addressed memory. The content addressed memory is illustrated schematically at the left by the dashed block 12. The memory stores words on different rows thereof, three of these rows being illustrated at 14, 16 and 18, respectively. When an interrogating word (known in the art as a tag word) is applied to the content addressed memory, outputs appear on the rows of the memory which store words corresponding to a tag word. These outputs appear in parallel. For example, if the zeroth, fourth and seventh row of the memory store words (the fourth and seventh rows are implied but not shown in FIG. 1) corresponding to the tag word, signals indicative of the binary bit "one" appear on the zeroth, fourth and seventh rows of the memory.

The signals appearing at the row outputs of the content addressed memory are temporarily stored in a register, illustrated schematically by the dashed block 20. For example, if the zeroth row of the memory has a word corresponding to the tag word, a "one" signal appears on output line 22 and this signal sets the $2^0$ flip-flop of the register 20. This causes a signal indicative of the binary bit one (hereafter simply termed a "one") to appear on the $2^0$ output line of the register. When a "one" appears on an output line of the register, that line is said to be "active" and when a "zero" appears on the output line of the register that line is said to be "inactive."

The purpose of line selection circuit 10 is to skip from active line to active line, in sequence. Each time the line selection circuit senses an active line, it produces an output on the RO line corresponding to that active line. The RO line supplies a read-out drive signal to the memory row corresponding to the selected active line of the register and causes the word on that row of the memory to be read out. Actually, the drive signal flows from the row to the storage elements (not shown) connected to that row. This causes sense signals to appear on the column leads (not shown) of the memory, and these sense signals are applied to sense amplifiers (not shown) connected to the column leads. Further, after a fixed delay, inserted by a delay line such as 24, the RO signal resets the flip-flop associated with the selected active line and that active line becomes inactive.

To illustrate the operation above, assume that the $2^0$ and $2^n$ lines are active and the $2^1$ through $2^{n-1}$ lines are inactive. At the first TP–1 signal (TP=timing pulse) applied to terminal 27, an output $RO_0$ appears on line 26. This causes the word stored on memory row 0 to be applied via the memory column leads to the sense amplifiers of the memory. The same $RO_0$ signal may be applied to strobe the sense amplifiers of the memory so that the word in memory row 0 is read out. The $RO_0$ signal is delayed by delay means 24 so that after the word is read out from memory row 0 the $2^0$ flip-flop is reset. The next time the TP–1 pulse occurs, the same procedure is followed for the $2^n$ line.

The content addressed memory of FIG. 1 is in itself known. A detailed discussion of one such memory appears in application Serial No. 213,339, filed July 30, 1962 by H. Weinstein and assigned to the same asignee as the present invention. There, the line selection circuit takes form of a convergent-divergent tree network.

Figure 2:
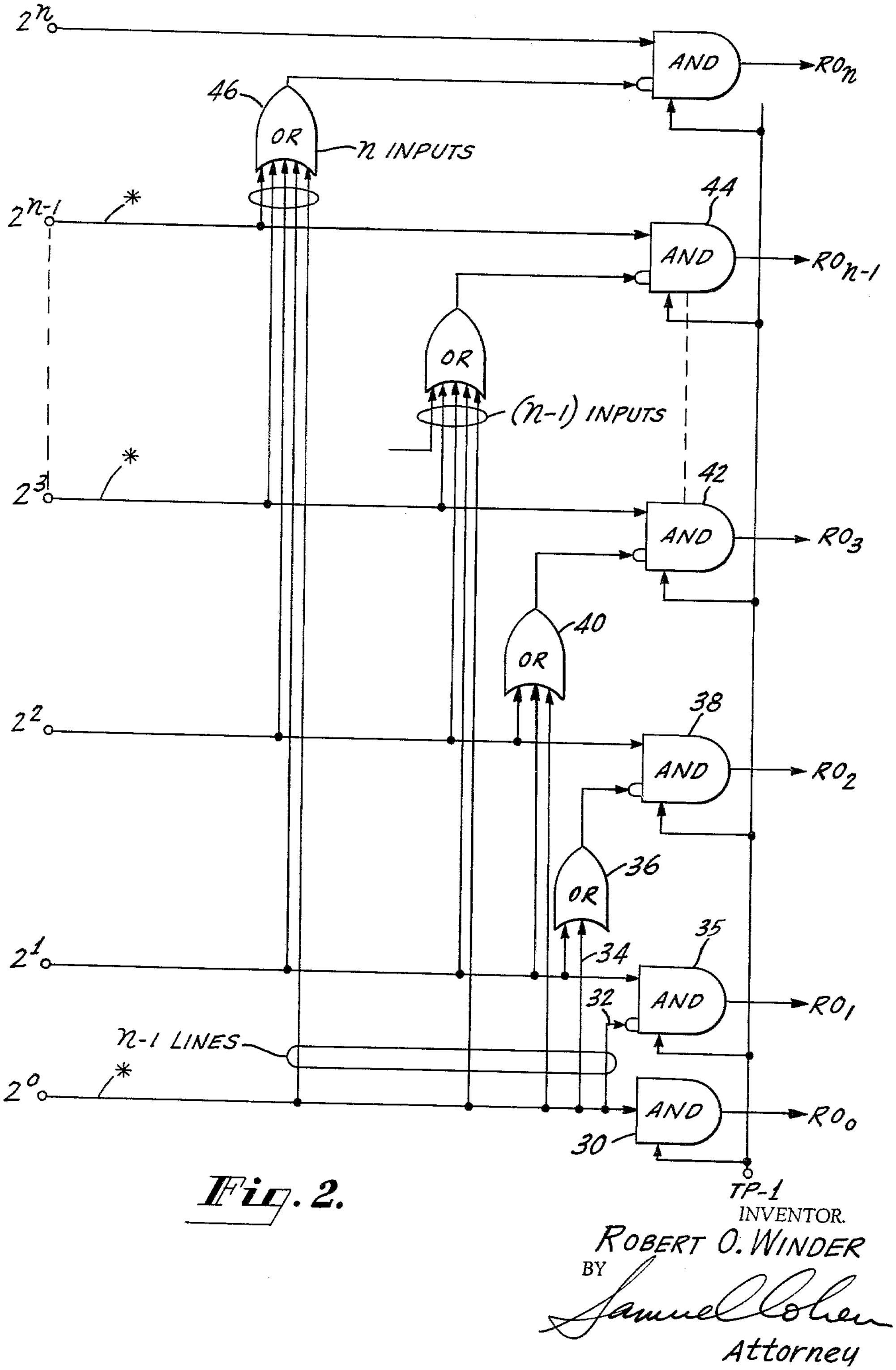
FIG. 2 is a schematic circuit diagram of a prior art selection circuit.

FIG. 2 illustrates a prior art line selection circuit of another type. It includes AND gates and OR gates.

Each input line is connected to a different AND gate. Each input line is also connected to the inhibit input terminal of all AND gates which receive bits of higher significance than the bit on that input line.

The operation of the circuit of FIG. 2 may be better understood by a specific example. Assume that the $2^0$, $2^3$ and $2^{n-1}$ lines are active (carry a "one"), and all other lines are inactive. (The active lines are indicated by an asterisk in FIG. 2.) When the first TP–1 signal is applied, AND gate 30 produces an output $RO_0$. The TP–1 signal is applied to all other AND gates. However, these gates are all disabled by an inhibit signal derived from the $2^0$ line. For example, an inhibit signal is applied via line 32 to the inhibit input terminal of AND gate 34. Similarly, an inhibit signal is applied via line 34 and OR gate 36 to the inhibit input terminal of AND gas 38 and so on.

As previously mentioned, the $RO^0$ signal is applied back, after a short delay interval, to the flip-flop (not shown) or other storage element from which the $2^0$ line comes. Therefore, after this delay interval, the $2^0$ flip-flop becomes reset and the $2^0$ line becomes inactive.

The next active line is the $2^3$ line. As the $2^0$, $2^1$ and $2^2$ lines all carry "zeros," OR gate 40 produces a "zero" output so that AND gate 42 is not inhibited. The $2^3$ line carries a "one" priming AND gate 42. Therefore, the next TP–1 pulse which occurs causes the output $RO_3$ to appear. After a short delay, the $RO_3$ signal is fed back to reset the $2^3$ flip-flop so that the $2^3$ lines becomes inactive. The next TP–1 pulse which occurs causes AND gate 44 to become enabled and the signal $RO_{n-1}$ to be read out in a manner similar to that already described.

While the circuit of FIG. 2 is suitable for a relatively small number of input lines, it becomes impractical when the number of inputs becomes very large. The reason is that the fan-in and fan-out requirements become excessive. For example, the $2^0$ line must supply a signal to all of the OR gates above this line as well as to the AND gate connected to that line. Therefore, the fan-out required of the $2^0$ line is $n$ lines. If $n$ is a large number, this provides both excessive power drain and also excessive tolerance requirements. The fan-in requirements for the upper OR gates is also excessive. For example, OR gate 46 has a total of $n$ inputs. If $n$ is a relatively large number, for example, over 100, such an OR gate is not realizable, at least not in a single stage. With numbers of inputs this large, even a very small amount of leakage current on each input line, in the absence of a bit, would cause the OR gate to produce an output and cause an error.

A prior art solution to the fan-in problem is given in FIG. 3. The gate at the left is a 9 input OR gate. If four gates, such as shown at the right, are substituted for this one gate, each of the gates has only 3 inputs. The disadvantage of this approach is that the number of OR gates needed to reduce the fan-in requirements may be very large. For example, if $f$, the number of inputs to a gate is some number such as 81, and it is desired that the maximum fan-in per gate be 3, a tree network having 40 gates will have to be substituted for the one gate. Further, similar means still have to be used to solve the fan-out problem of the active lines.

There are methods in the prior art for reducing somewhat the number of gates discussed above, but always at considerable expense. For example, the fan-in can be reduced at the expense of fan-out. The fan-out can be reduced but this causes an increase in fan-in. Both fan-in and fan-out may be reduced but at the expense of considerable additional circuit delays.

Figure 4:
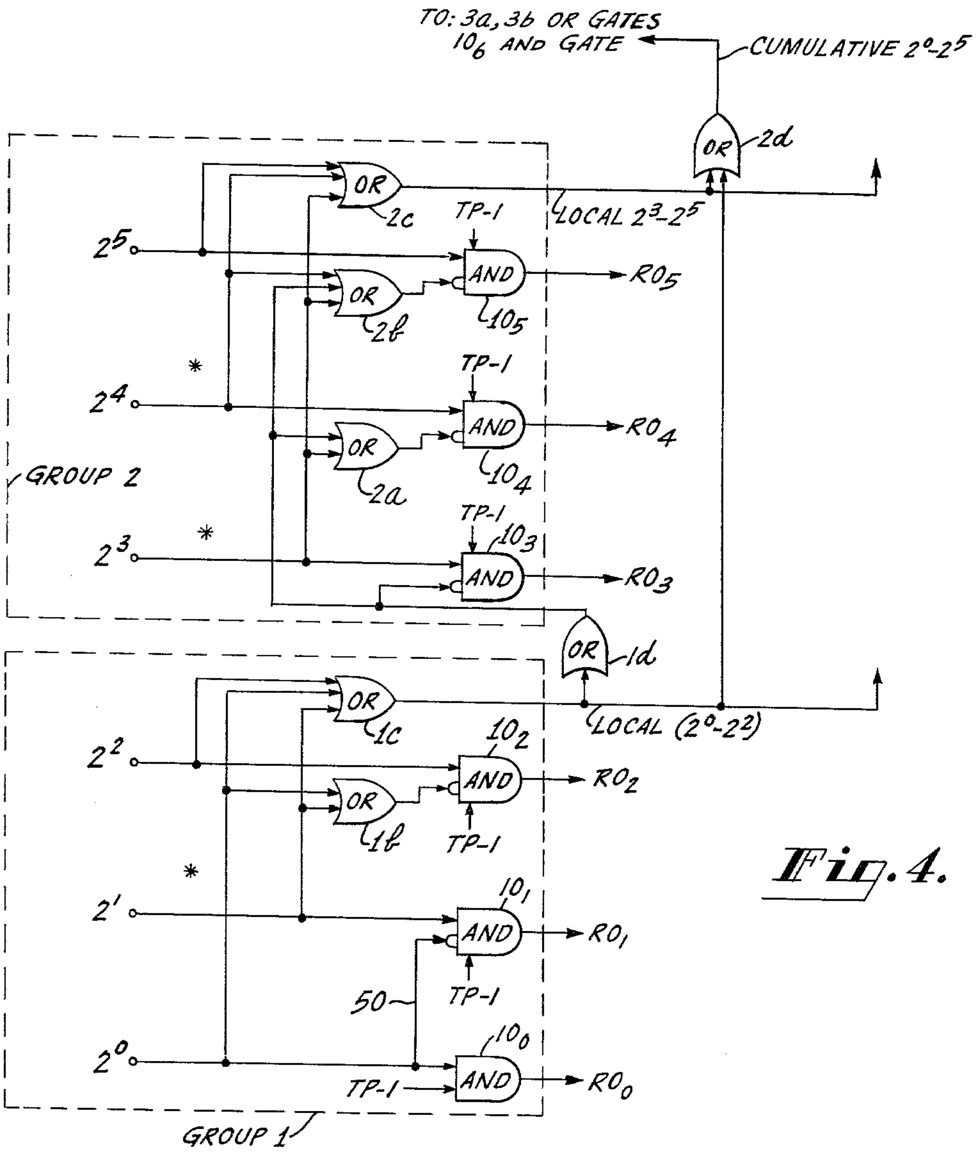
FIG. 4 is a block circuit diagram of a selection circuit according to the present invention in which the maximum fan-in/fan-out permitted is 3.

The priority circuit of FIG. 4 solves the problems above with relatively few gates and with little loss of circuit operating speed. In brief, what is done is to subdivide the input lines into groups of $m$ lines each (in this example, $m=3$), to obtain from each $m$ lines an output inhibit signal indicative of the logical sum of the signals on these lines, and to apply the logical sum of this output inhibit signal, and the cumulative inhibit signal(s) of the preceding group(s) of gates to the next succeeding group of gates, where $m$=the maximum fan-in/fan-out permitted.

The invention is illustrated in FIG. 4 by showing six of the $n$ input lines. The first input line $2^0$ is connected to the AND gate $\mathbf{10}_0$ and to the OR gates 1$b$ and 1$c$ (a fan-out of only 3). The next line, that is, the $2^1$ line is connected to the AND gate $\mathbf{10}_1$ and to OR gates 1$b$ and 1$c$, again a fan-out of 3. The next line, that is, the $2^2$ line is connected to AND gate $\mathbf{10}_2$ and to OR gate 1$c$ (a fan-out of only 2). The output of OR gate 1$c$ is the logical sum of the signals present on the $2^0$, $2^1$ and $2^2$ lines. This signal is hereafter termed the "local" signal. It is applied to three OR gates, 2 of which, 1$d$ and 2$d$, are shown. OR gate 1$d$ supplies its output to the inhibit terminal of AND gate $\mathbf{10}_3$ and to OR gates 2$a$ and 2$b$, again, a fan-out of 3. This output, which is the logical sum of the signals on all lines below OR gate 1$d$, is termed a cumulative inhibit signal. In the present instance, the cumulative inhibit signal is the same as the local signal. However, in the succeeding cases it is not. For example, in the case of the 2$d$ OR gate, the cumulative inhibit signal is indicative of the $2^0$–$2^5$ input lines, whereas the local signal is indicative only of the $2^3$–$2^5$ lines.

The operation of the system of FIG. 4 may be illustrated by the following specific example. Assume that the $2^1$, $2^3$ and $2^4$ lines are active and all remaining lines are inactive. If the $2^0$ line is inactive, a "zero" appears on line 50 so that AND gate $\mathbf{10}_1$ is not inhibited. Therefore, the first TP–1 which occurs produces an output $RO_1$. After a short delay, the $2^1$ line becomes inactive. At this time AND gate $\mathbf{10}_2$ is not inhibited. However, the $2^2$ line carries a "zero" so that AND gate $\mathbf{10}_2$ is disabled. If the $2^0$, $2^1$ and $2^2$ lines all carry a "zero," the output of OR gates 1$c$ and 1$d$ are both zero. Therefore, AND gate $\mathbf{10}_3$ is not inhibited.

The next TP–1 which occurs causes AND gate $\mathbf{10}^3$ to produce its output $RO_3$. A short interval later, the $2^3$ line becomes disabled. When the $2^3$ line becomes disabled, OR gate 2$a$ produces a "zero" output. Therefore, the next TP–1 which occurs causes AND gate $\mathbf{10}_4$ to produce its output $RO_4$. Shortly thereafter, the $2^4$ line becomes disabled. Therefore, OR gate 2$c$ produces a "zero" output. OR gate 2$d$ therefore also produces a "zero" output since it receives a "zero" from OR gate 2$c$ and a "zero" from OR gate 1$c$.

In the circuit of FIG. 4, the maximum fan-in to an OR or AND gate is 3. The maximum fan-out from any line is also 3.

Figure 5:
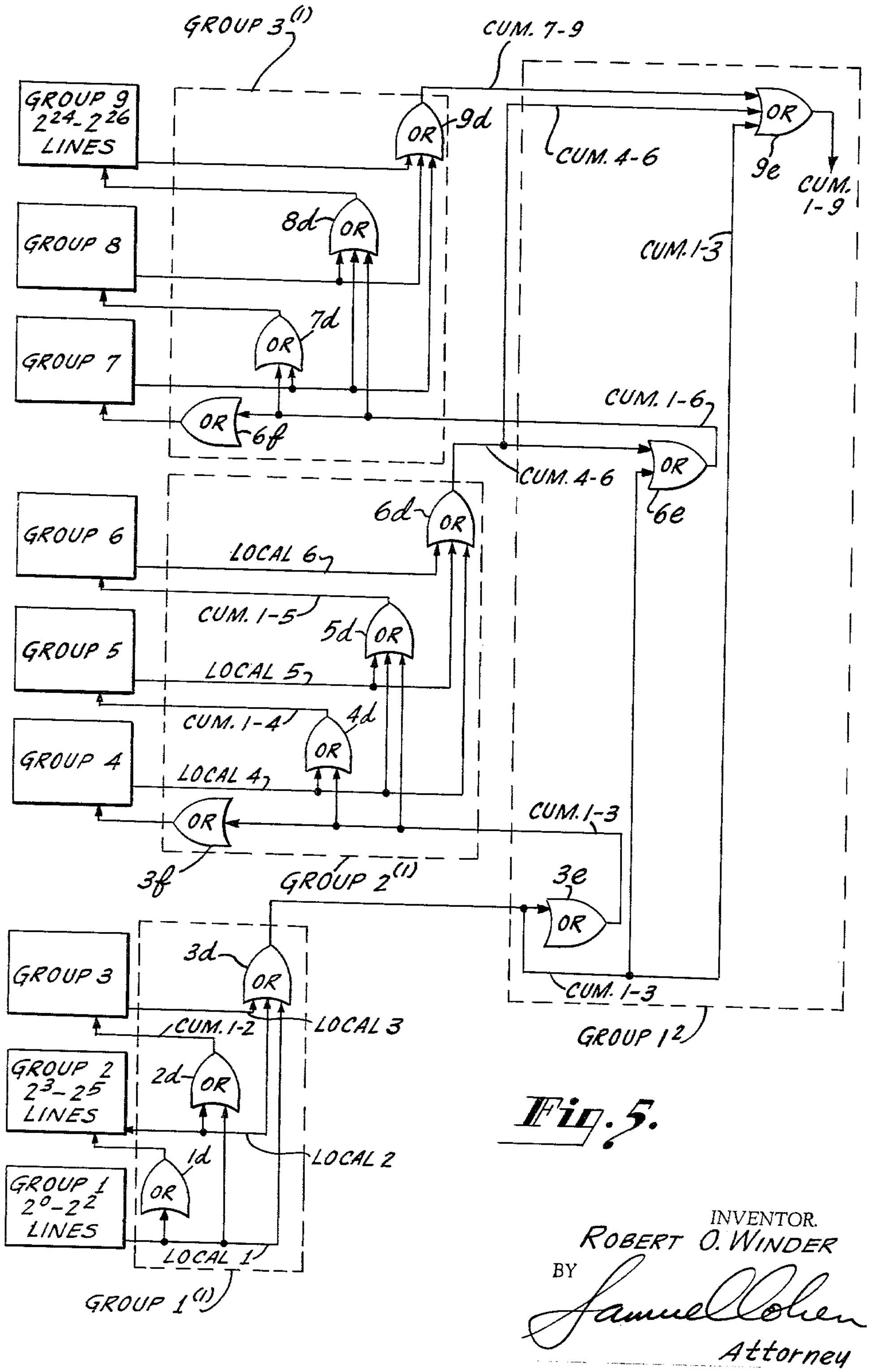
FIG. 5 is a block circuit diagram of a larger selection circuit according to the present invention.

A line selection circuit according to the present invention and designed to handle 27 input lines is shown in FIG. 5. In this circuit, the blocks at the left represent circuits such as shown in FIG. 4. For example, group 1 includes three AND gates and two OR gates such as shown in the dashed block legended group 1 in FIG. 4. Group 2 contains three AND gates and three OR gates as is also shown in FIG. 4. All successive groups also have three AND gates and three OR gates.

In the circuit of FIG. 5, no OR or AND gate has more than three inputs and no input line is required to fan-out to more than 3 other stages. The number of additional OR gates required in the circuit of FIG. 5 over a comparable circuit of the type shown in FIG. 2 is only 14. If the approach suggested in FIG. 3 were employed, the number of additional OR gates required to take care of the fan-in problem would be about 190. In addition, many additional amplification stages would be required to handle the fan-out problem.

In the circuits of FIGS. 4 and 5 discussed above, the fan-in and fan-out permissible was limited to three. With larger numbers of fan-ins and fan-outs permissible, the number of gates can be reduced correspondingly. With a fan-in/fan-out of $m$ permitted, then the number of AND gates in each group is $m$. In other respects, the circuit follows the circuit shown in FIGS. 4 and 5.

Figure 6:
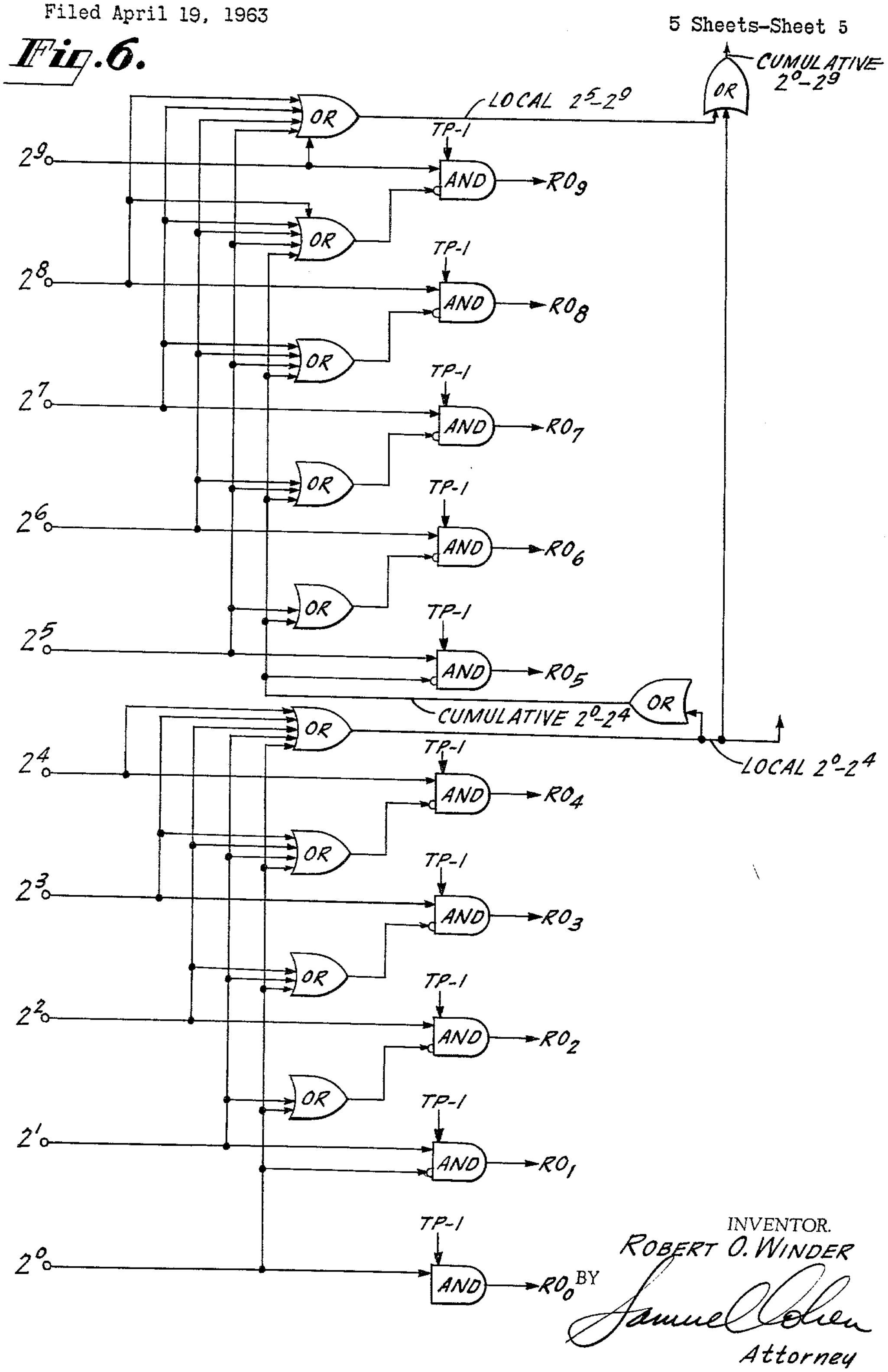
FIG. 6 is a block circuit diagram of a selection circuit according to the present invention in which the maximum fan-in/fan-out permitted is 5.

To illustrate the above, a circuit employing gates with a maximum fan-in/fan-out of 5 is illustrated in FIG. 6. The operation of the circuit is quite analogous to that of the circuit shown in FIG. 4, and therefore need not be discussed in detail.

In general, if $f$=fan-in/fan-out, and $n$=the number of input lines, then the total number T of OR gates required (assuming $\log_f n$ to be integral) is:

$$T=n+\left[\frac{n}{f}\cdot\frac{f+1}{f}-1\right]+\left[\left(\frac{n}{f^2}\right)\cdot\left(\frac{f+1}{f}\right)-1\right]+\cdots+\left[f\cdot\frac{f+1}{f}-1\right]$$

$$T=\frac{(f^2+1)}{f(f-1)}n-\frac{(f+1)}{(f-1)}-\log_f n+1$$

The average number of inputs per OR gate is about $f+3/2$. For example, if $n=2401$ and $f=7$, then the total number of OR gates required in the system is 2854, with the total number of inputs to the OR gates about 14,000. If $n=32$, $f=6$, there are roughly 38 OR gates having a total of somewhat over 210 inputs. If $n=63$, $f=6$, there are somewhat fewer than 90 OR gates, having a total of about 400 inputs.

The maximum delay interval betwen the time an active delay line is selected and the time an enabling signal (a zero) is fed back to the inhibit terminal of the AND gate generating the RO signal for that line, is $2[\log_f n]-1$, where $n$=the total number of lines, and $f$=the maximum fan-in/fan-out permitted.

The circuits of the invention are illustrated as including AND gates connected to each input line. It should be appreciated that other types of logical product gates as, for example, NOR gates may be substituted instead. If NOR gates are substituted for the AND gates, the TP pulses represent "zeros" instead of "ones" and the selection circuits of the invention select, in sequence, the lines carrying the binary bit zero.

The purpose of the 1-input OR gates, for example, in FIG. 5, gate 3, is to provide additional fan-out. Therefore, an amplifier can be substituted for any such 1-input gate.

What is claimed is:

1. In a selection circuit,
means manifesting a parallel binary word having $n$ bits, each of different rank;
$n$ gates, each connected to receive a different bit, said gates being arranged in groups of $m$ gates each, where $m$ is an integer smaller than $n$, and the gates of each group receiving bits of immediately successive rank;
inhibit circuit means responsive to the reception by a gate in a group of a bit of given value for disabling the gates, if any, in the same group which receive bits of higher rank; and
cumulative inhibit circuit means, one per group of gates, each responsive to the reception by a gate in its group of a bit of said given value, for disabling the next succeeding group of $m$ gates, and for actuating the cumulative inhibit circuit means for all succeeding groups of gates.

2. In a selection circuit,
means manifesting a parallel binary word having $n$ bits, each of different rank;
$n$ gates, each connected to receive a different bit, said gates being arranged in $x$ groups of $m$ gates each and one group of $p$ gates, where $p$ is an integer not greater than $m$ and $xm+p=n$, and the gates of each group receiving bits of immediately successive rank;
inhibit circuit means responsive to the reception by a gate in a group of a bit of given value for disabling the gates, if any, in the same group which receive bits of higher rank; and
cumulative inhibit circuit means, one per group of gates, each responsive to the reception by a gate in its group of a bit of said given value, for disabling the next succeeding group of gates, and for actuating the cumulative inhibit circuit means for all succeeding groups of gates.

3. In a selection circuit,
means manifesting a parallel binary word having $n$ bits, each of different rank;
$n$ AND gates, each connected to receive a different bit, said gates being arranged in $x$ groups of $m$ gates each, where $xm=n$, and each group of gates receiving bits of immediately successive rank;
inhibit circuit means responsive to the reception by a gate in a group of the manifestation of the binary bit "one" for applying disabling signals to the gates, if any, in the same group which receive bits of higher rank; and
$x$ cumulative inhibit circuit means, one per group of gates, each responsive to the reception by a gate in its group of the manifestation of the binary bit "one," for disabling the next succeeding group of $m$ gates, and for actuating the cumulative inhibit circuit means for all succeeding groups of gates.

4. In a selection circuit,
$n$ lines, each representing a binary bit of different rank;
$n$ gates, each connected to a different line so that each receives a bit of different rank, said gates and lines being arranged in $x$ groups of $m$ units each, and each group of gates receiving bits of immediately successive rank;
inhibit circuit means responsive to the presence on a line of a bit of given value for applying disabling signals to the gates, if any, in the same group which receive bits of higher rank; and
$x$ cumulative inhibit circuit means, one per group of gates, each responsive to the reception by a gate in its group of a bit of said given value, for disabling the next succeeding group of $m$ gates, and for actuating the cumulative inhibit circuit means for all succeeding groups of gates.

5. In a selection circuit,
means manifesting a parallel binary word having $n$ bits, each of different rank;
$n$ logical product gates, each connected to receive a different bit, said gates being arranged in groups of $m$ gates each, where $m$ is an integer which is a submultiple of $n$, and each group of gates receiving bits of immediately successive rank;
$n$ OR gates, one per line, each OR gate in a group applying an inhibit signal to the logical product gates in the same group, if any, which receive bits of higher rank, when that OR gate receives a binary bit of given value; and
cumulative OR inhibit circuit means, one per group of gates; responsive to the reception by a logical product gate in its group of a bit of said given value, for disabling the logical product gates of the next succeeding group of $m$ gates, and for actuating the cumulative OR inhibit circuit means for all succeeding groups of gates.

6. In combination,
a content addressed memory for producing a parallel binary word having $n$ bits, each of different rank, said word indicating the addresses of words desired to be read out of the memory;
$n$ gates, each connected to receive a different bit, said gates being arranged in $x$ groups of $m$ gates each and one group of $p$ gates, where $p$ is an integer not greater than $m$ and $xm+p=n$, and the gates of each group receiving bits of immediately successive rank;
inhibit circuit means responsive to the reception by a gate in a group of a bit of given value for disabling the gates, if any, in the same group which receive bits of higher rank; and cumulative inhibit circuit means, one per group of gates, responsive to the reception by a gate in its group of a bit of said given value, for disabling the next succeeding group of gates, and for actuating the cumulative gate circuit means for all succeeding groups of gates.

7. In a selection circuit, means manifesting a parallel binary word having $n$ bits, each of different rank;

$n$ logical product gates, each connected to receive a different bit, said gates being arranged in $x$ groups of $m$ gates each and one group of $p$ gates, where $p$ is an integer not greater than $m$ and $xm+p=n$, and the gates of each group receiving bits of immediately successive rank;

means including OR gates responsive to the presence in the bits supplied to a group of a bit of given value for disabling the logical product gates, if any, in the same group, which receive bits of higher rank; and cumulative inhibit circuit means, one per group, of gates, responsive to the reception by a logical product gate in its group of a bit of said given value, for disabling the next succeeding group of logical product gates, and for actuating the cumulative inhibit circuit means for all succeeding groups of logical product gates.

No references cited.

ARTHUR GAUSS, *Primary Examiner.*